United States Patent
Faye

[11] Patent Number: 5,762,366
[45] Date of Patent: Jun. 9, 1998

[54] SAFETY SYSTEM

[75] Inventor: Ian C. Faye, Stuttgart, Germany

[73] Assignee: Autoliv ASP, Inc., Ogden, Utah

[21] Appl. No.: 743,588

[22] Filed: Nov. 4, 1996

[30] Foreign Application Priority Data

Dec. 29, 1995 [DE] Germany .................. 195 49 083.5

[51] Int. Cl.$^6$ .................................................. B60R 21/16
[52] U.S. Cl. ............................................................. 280/735
[58] Field of Search ............................................... 280/735

[56] References Cited

U.S. PATENT DOCUMENTS

| | | | |
|---|---|---|---|
| 5,208,484 | 5/1993 | Okano et al. | 280/735 |
| 5,424,714 | 6/1995 | Kin et al. | 280/735 |
| 5,605,202 | 2/1997 | Dixon | 280/735 |

*Primary Examiner*—Kenneth R. Rice

[57] ABSTRACT

The invention relates to a safety system for a motor vehicle having first and second sensor means, by means of which sensor parameters representing the vehicle movement dynamics of the vehicle are detected. Furthermore, vehicle movement means and restraining means are provided, actuators which influence the vehicle movement dynamics of the vehicle being actuated by means of the vehicle movement means on the basis of the detected sensor parameters of the at least first sensor means, and a restraining system being activated by means on the restraining means on the basis of the detected sensor parameters of the second sensor means. The essential feature of the invention consists in the fact that a signal representing the condition of the road pavement is formed on the basis of sensor parameters of the second sensor means, and this signal is used in the vehicle movement means to actuate the actuators. By virtue of the invention, adaptation of the vehicle movement means to the currently prevailing condition of the road pavement is achieved without a relatively large additional outlay.

6 Claims, 1 Drawing Sheet

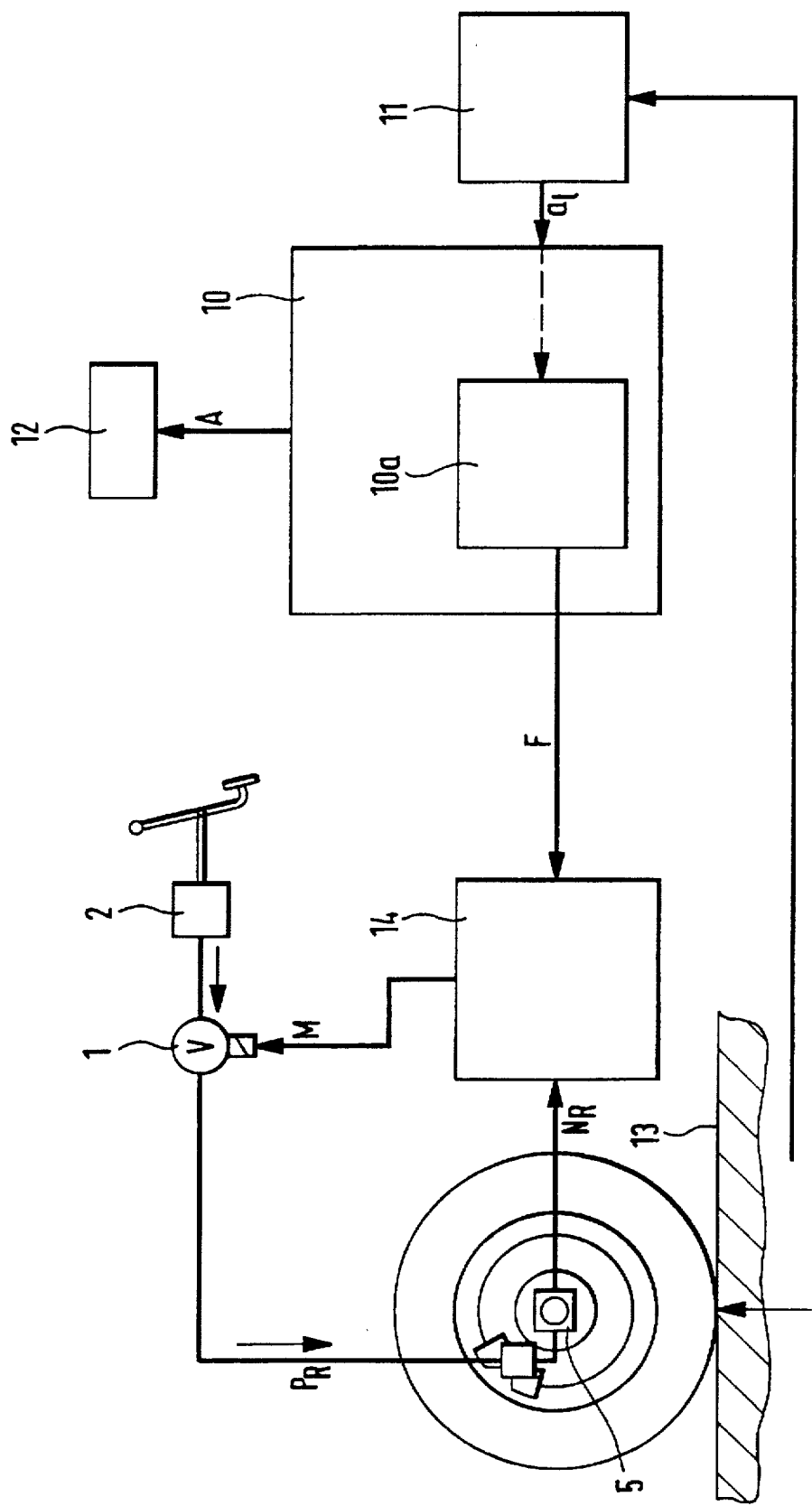

SAFETY SYSTEM

DESCRIPTION OF THE RELATED ART

The invention relates to a safety system for a motor vehicle.

Systems for avoiding locking of the wheels of a vehicle (antilock systems, ABS), for regulating the drive slip of the driven wheels (traction control system, TCS), for regulating the lateral movement of a vehicle or the lateral stability of a vehicle (vehicle movement regulating systems, VMS) and for regulating or controlling a variably configured chassis in motor vehicles (chassis control systems, CCS) are known.

In order to reduce injuries to the occupants of vehicles in accidents, in particular in the case of head-on collisions, airbags have gained widespread acceptance as a restraining system in the last few years. An airbag which has unfolded completely before the driver makes contact with the airbag provides optimum protection. This requires rapid detection of a crash (determination of severe deceleration of the vehicle) which is made possible by means of signals of a corresponding acceleration sensor which is generally arranged in the airbag control unit. Of course, the avoidance of accidents would be preferable for vehicle occupants and car owners. To this end, in particular the abovementioned ABS, TCS and VMS systems have acquired a large degree of acceptance as so-called vehicle movement safety systems. Here, the targeted exertion of influences on the forces acting on the wheel enables skidding of the vehicle to be avoided.

When setting the regulating parameters of such vehicle movement systems, efforts are made to take account of as wide a spectrum of road coverings as possible. However, in particular on uneven road pavements the effects of the systems may be degraded. Therefore, it is known to adapt the regulating parameters of such systems to the quality of the road pavement. Such a rough road function is then integrated into the control unit of the systems. A rough road (for example as a result of so-called unevennesses in the road pavement) is considered as an interference parameter in the regulating circuit, it being possible for the impacts on the wheel to lead to short-term, non-enduring braking, and thus to start an "activation" of the regulator. Further adaptation consists for example in reducing the slip threshold after regulation which has lasted for a specific time. For further possible ways of adapting such vehicle movement systems to the quality of the road pavement, EP,B1,0 293 393 should be referred to.

For the detection of a stretch of rough road there may be provision for the integration of an additional "rough road sensor", but this has disadvantages owing to the costs and the quality requirement.

Furthermore, it is known to adapt the regulating parameters of an engine control system to the quality of the road pavement. This applies in particular in respect of misfires caused by unevennesses in the road pavement. In this respect, German Offenlegungsschrift 42 15 938 and German Offenlegungsschrift 42 29 487 should be referred to.

German Offenlegungsschrift 42 12 337 (corresponds to U.S. Pat. No. 5,372,411) discloses that a control unit for controlling a restraining system and an ABS/TCS control unit are combined to form a single control unit. Here, the restraining system is triggered as a function of an acceleration sensor. With such an integrated composite control unit (restraining system and ABS/TCS system), it is proposed, for the purpose of functional improvement, that the signal of this acceleration sensor be additionally processed in the ABS/TCS system.

SUMMARY OF THE INVENTION

The invention relates to a safety system for a motor vehicle having first and second sensor means, by means of which sensor parameters representing the movement or the vehicle movement dynamics of the vehicle are detected. Furthermore, vehicle movement means (exertion of influence on the wheel forces) and restraining means are provided, actuators which influence the vehicle movement dynamics of the vehicle being actuated by means of the vehicle movement means on the basis of the detected sensor parameters of the at least first sensor means, and a restraining system being activated by means of the restraining means on the basis of the detected sensor parameters of the second sensor means. The essential feature of the invention consists in the fact that a signal representing the condition of the road pavement is formed on the basis of sensor parameters of the second sensor means, and this signal is used in the vehicle movement means to actuate the actuators.

As a result of the invention, an adaptation of the vehicle movement means to the currently prevailing condition of the road pavement is achieved without a relatively large additional outlay. For example, such an adaptation may consist in slip thresholds in the vehicle movement means being reduced as a function of the sensor signals of the sensor devices of the restraining system.

In an advantageous refinement of the invention, there may be provision for the signal representing the condition of the road pavement to be formed in the restraining means. For the formation in the restraining means, the program of the corresponding restraining system control unit can be easily expanded with a "rough road" function. Only the output signal of the "rough road" function has to be entered into the vehicle movement dynamics control unit.

In particular, there is provision for the signal representing the condition of the road pavement to specify a measure of the unevenness of the road pavement. In this context, the signal specifying the unevenness of the road pavement may specify a probability of whether the motor vehicle is moving on an undulating (uneven) or even (planar) road pavement.

The second sensor means, that is to say the sensor means which are assigned primarily to the restraining system, may be configured such that their main sensitivity is in the direction of travel. Here, there may be provision for these sensor means to detect, in addition to the longitudinal acceleration of the vehicle, also the accelerations of the vehicle which have components in directions which are transverse in particular perpendicular, with respect to the longitudinal direction of the vehicle. Although these sensors are used with the main sensitivity direction in the direction of travel, these sensors may also be used to detect the road unevennesses acting generally longitudinally and/or perpendicularly with respect thereto. In particular, there may be provision for such sensors to be mounted with a slight incline with respect to their main sensitivity direction.

According to the invention, the systems mentioned at the beginning can be designed, as vehicle movement means,
- to avoid locking of the wheels of the vehicle (ABS),
- to regulate the drive slip of the driven wheels (TCS),
- to regulate or control the vertical movements of the vehicle (CCS),
- to control the engine and/or
- to regulate the vehicle movement dynamics (lateral dynamics of a vehicle or stability of a vehicle, VMS).

The actuators here are the wheel brake systems, the propulsion or drive system and/or a variable suspension arranged between the body of a vehicle and the wheels.

Further advantageous refinements can be found in the subclaims.

BRIEF DESCRIPTION OF THE DRAWING

The FIGURE shows an exemplary embodiment of the system according to the invention with reference to a block diagram.

DETAILED DESCRIPTION OF THE INVENTION

The invention will be clarified with reference to the exemplary embodiment described below.

The FIGURE shows, in the left-hand part, a wheel which rolls on a road pavement 13. The rotational speed $N_R$ of the wheel is detected by the rotational speed sensor 5 and fed to the vehicle movement control unit 14. In this exemplary embodiment, this is intended to be an ABS control unit. Depending on the wheel speed $N_R$, the signal M, by means of which the brake pressure $P_R$ in the wheel brake cylinder 3 can be increased, reduced or kept constant using the solenoid valve 1 (illustrated in simplified form), is formed in the ABS control unit 14 in accordance with an algorithm known per se, generally as a function of the wheel slip and the wheel deceleration. The master brake cylinder which can be actuated by the driver by means of the brake pedal is represented with the reference symbol 2.

In this exemplary embodiment, an airbag 12 is triggered as restraining means by the airbag control unit 10 by means of the triggering signal A. The triggering signal A is determined here in a manner known per se by evaluating a signal $a_1$ which specifies the longitudinal deceleration of the vehicle. This signal is produced in the acceleration sensor 11 and fed to the airbag control unit 10. The acceleration sensor 11 may also be arranged here within the airbag control unit 10.

In this exemplary embodiment, means 10a are provided in the airbag control unit 10 which analyze the signal $a_1$ of the acceleration sensor 11 for components which represent a movement of the vehicle perpendicular to the direction of travel. These may be vertical or lateral vehicle body accelerations which occur in particular as a consequence of unevennesses in the road pavement 13. The signal $a_1$ is evaluated in the means 10a with the effect that the intensity of the road pavement disruption is evaluated as a function of the quality of the road pavement and the speed. The output signal F which is produced from this may be proportional to the prevailing unevenness of the road pavement or may specify the probability that the vehicle is moving on a rough road. This signal F is then fed to the ABS control unit 14 and processed there in the manner described.

In summary, the invention can be presented as follows:

The essential feature of this invention is the detection of the unevennesses in the road pavement using the airbag acceleration sensor 11. A new function in the airbag control unit 10 or 10a can be easily programmed and can output the intensity of the road pavement disruption as a function of the quality of the road pavement and the speed. Although the acceleration sensor 11 is used with the main sensitivity direction in the direction of travel, the unevennesses in the road generally act longitudinally and vertically. The airbag control unit 10 or 10a will thus be able to output a number or a signal which corresponds proportionally to the measured "rough road". This number can represent the probability that the vehicle is moving on rough roads. As the probability increases, the slip threshold for the ABS regulator 14 can then be correspondingly reduced.

The invention proposed here does not require, in particular in comparison with German Offenlegungsschrift 42 12 337 mentioned at the beginning (corresponds to U.S. Pat. No. 5,372,411), that the airbag control unit and the ABS control unit be integrated in one housing, although the integration would be advantageous. Only the output signal from the "rough road" function has to be entered into the ABS control unit 14. A particularly elegant transmission of the signal would be possible for example using a bus system between the control units. Such systems are known for example as CAN. As a result, the invention could be implemented and used with minimum outlay and would not be dependent on the integration of the two control units.

An important advantage of this invention is not only the simplification of the rough road detection algorithm in the ABS control unit 14 but also the omission of any continuous ABS or TCS control which has previously been necessary for the detection. This reduces the loading and the wear on the ABS assembly and can thus lead to a longer service life and a lower failure potential of the system.

A further advantage is that the level of equipment of the vehicle with an airbag system is becoming ever higher. An acceleration sensor 11 will thus be present in almost every new vehicle. The coupling, according to the invention, of the ABS, TCS, VMS and/or CCS system with the airbag system leads to a high-performance composite system.

What is claimed is:

1. An integrated supplemental restraint and vehicle control sensor system, comprising:

a first sensor sensing rotational speed of at least one wheel of a vehicle and providing a first signal indicative of the rotational speed;

a second sensor sensing acceleration of the vehicle and providing a second signal indicative of the acceleration;

a supplemental restraint system constructed and arranged for mounting in the vehicle;

a supplemental restrain system control unit operatively associated with said second sensor and receiving said second signal, and said control unit operatively associated with and controlling said supplemental restraint system, said control unit further producing a road pavement condition signal based upon portions of said second signal substantially normal to the direction of travel of the vehicle.

2. A system as in claim 1, wherein said road pavement condition signal specifies a measure of the unevenness of the road pavement upon which the vehicle is traveling.

3. A system as in claim 1, further including at least one vehicle movement control unit associated with the vehicle, said vehicle movement control unit being selected from the group consisting of anti-lock braking unit, drive wheel slip regulation unit, vehicle vertical movement regulation unit, engine control unit, and vehicle movement dynamics control unit, and wherein said at least one vehicle movement control unit is operatively associated with said road pavement condition signal.

4. A system as in claim 3, wherein said road pavement condition signal specifies a measure of the unevenness of the road pavement upon which the vehicle is traveling.

5. A system as in claim 3, wherein said wherein said at least one vehicle movement control unit is operatively associated with said first signal.

6. A system as in claim 5, wherein said road pavement condition signal specifies a measure of the unevenness of the road pavement upon which the vehicle is traveling.

* * * * *